J. E. NORTH, J. H. McCAULEY & J. G. BYTHEWAY.
NUT LOCK.
APPLICATION FILED DEC. 27, 1913.
1,134,896.
Patented Apr. 6, 1915.
2 SHEETS—SHEET 1.
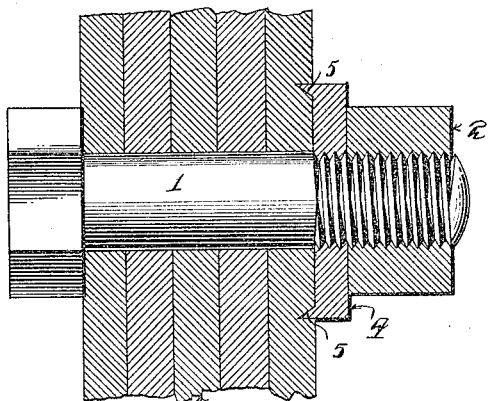
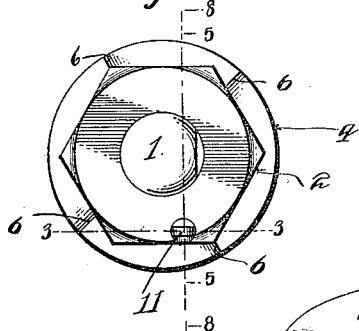
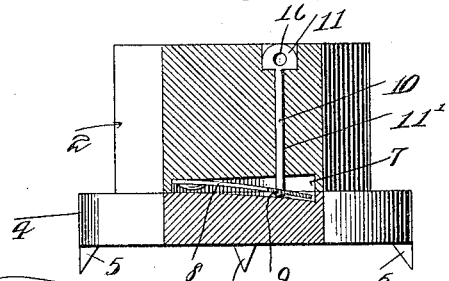
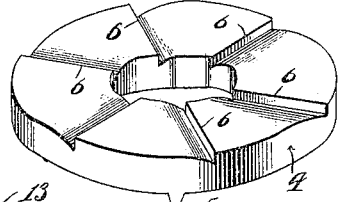
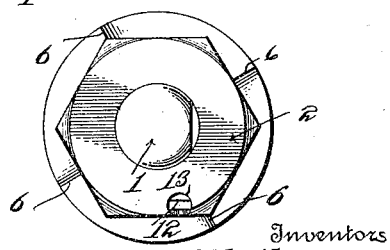
Inventors
J. E. North.
J. H. McCauley
J. G. Bytheway
Witnesses
Frederick N Taylor
By Victor J. Evans
Attorney

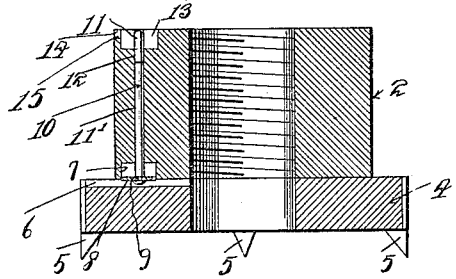
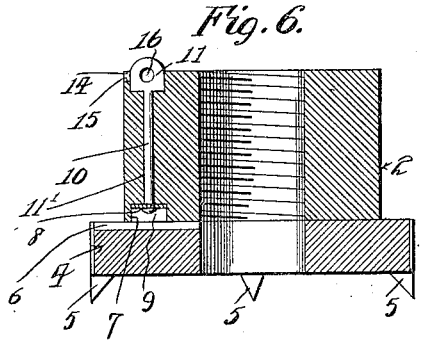
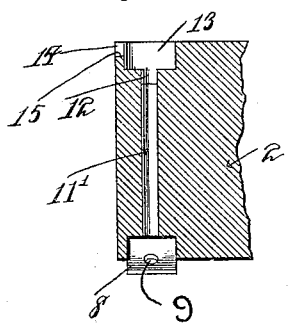
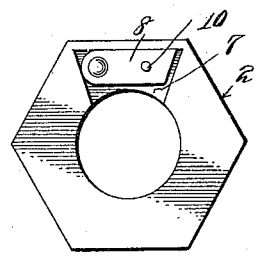
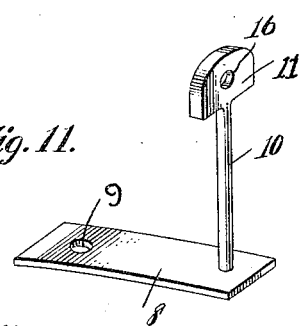
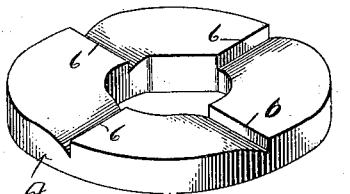

UNITED STATES PATENT OFFICE.

JOHN E. NORTH, JAMES H. McCAULEY, AND JOHN G. BYTHEWAY, OF ELLSWORTH, PENNSYLVANIA.

NUT-LOCK.

1,134,896. Specification of Letters Patent. Patented Apr. 6, 1915.

Application filed December 27, 1913. Serial No. 809,074.

*To all whom it may concern:*

Be it known that we, JOHN E. NORTH, JAMES H. MCCAULEY, and JOHN G. BYTHEWAY, citizens of the United States, residing at Ellsworth, in the county of Washington and State of Pennsylvania, have invented new and useful Improvements in Nut-Locks, of which the following is a specification.

The present invention relates to means for locking a nut upon a bolt, and more especially to a peculiar arrangement of parts upon a nut whereby the locking member may be brought and held in disengaging position so as to permit of the separation of the nut from the bolt.

With the above and other objects in view, the invention resides in the construction, combination and arrangement of parts set forth in the following specification and falling within the scope of the appended claim.

In the drawings: Figure 1 is a view illustrating a nut and bolt in a locked position in accordance with the present invention, Fig. 2 is a face view of the same, looking toward the nut, Fig. 3 is a sectional view on the line 3—3 of Fig. 2, Fig. 4 is a similar sectional view but illustrating the rotary pin raised and seated to retain the spring lock out of engaging position, Fig. 5 is a sectional view on the line 5—5 of Fig. 2, Fig. 6 is a similar view with the pin raised and the spring lock in disengaging position, Fig. 7 is a face view of the nut, the pin being removed, Fig. 8 is a greatly enlarged detail sectional view on the line 8—8 of Fig. 7, Fig. 9 is a view of the washer, Fig. 10 is a view of the nut looking toward the inner face thereof, Fig. 11 is a detail perspective view of the spring lock and the rotary pin connected therewith, and Fig. 12 is a perspective view of a second form of washer.

Referring now to the drawings in detail, 1 designates a headed bolt and 2 a nut for the bolt.

As shown in Fig. 1 of the drawings, the nut and bolt are provided for connecting a series of plates 3, and arranged upon the bolt and interposed between the inner face of the nut and the outer plate 3 is a washer 4. The washer has its inner face provided with ribs or spurs 5 which enter one of the plates 3, the said spurs being forced into the said plate when the nut is screwed home upon the bolt, or if desired, a blow may be delivered to the outer face of the washer for forcing the spurs within the plate before the nut is attached to the bolt. The washer has its outer face formed with a plurality of depressions which terminate in shoulders 6, and the inner face of the nut is provided with a depression 7 arranged between its outer perimeter and its bore, within which is secured one end of a spring lock 8 that is adapted to ratchet over the shoulders 6 when the nut is rotated upon the bolt, until the said nut is screwed entirely home, when the spring will engage with one of the shoulders and lock the nut upon the washer, and consequently upon the bolt. The upper wall provided by the recessed portion 7 is beveled or inclined, and the spring lock is secured within the shallow portion of the recess, the wider portion of the recess providing ample space for the reception of the working end of the lock.

The lock, as illustrated in the drawings, is constructed of a plate of resilient material, and is provided at a suitable distance from its engaging or working end with an orifice 9 which is adapted to receive the reduced and rounded end of a pin 10. This reduced end is formed with a head 11, whereby the pin is effectively, but rotatably secured to the lock. The pin passes through a suitable opening 11′ provided in the nut, preferably adjacent one of the corners thereof. The opening 11′ communicates with an elongated depression which provides a pocket 12, the said pocket entering an enlarged rounded chamber 13 which communicates with the outer face of the nut. The chamber has its outer wall, at its upper portion formed with a slot or depression 14 that communicates with the outer face of the nut, and the lower wall formed by the slot provides what I will term a fulcrum wall and which is designated by the numeral 15.

The pin 10 has its head 11 of a thickness corresponding with the diameter of the rounded body of the pin, but which extends beyond the opposite sides of the pin, the said head being of a width and thickness to be snugly received within the pocket 12 when the lock spring is in engaging position and is also of a size to permit of the same being rotated within the chamber 13 and to rest upon the lower wall of the chamber, at a right angle to the pocket 12, when the pin is raised to bring the spring lock within the recess 7 and out of engagement with the shoulder of the washer. The head 11 is provided, adjacent its upper end, with a transverse opening 16 which, when the pin is within the pocket 12 and the spring in locking position, is disposed slightly below the plane of the fulcrum wall 15, whereby a pointed instrument may be passed through the slot 14 to within the opening 16, and rest upon the wall 15, the said wall forming a fulcrum point for the instrument, so that the pin may be readily raised from the pocket and rotated to bring its head upon the wall of the chamber transversely of the pocket, and so sustain the spring 8 in an unlocking position to permit of the removal of the nut from the washer.

From the above description, taken in connection with the accompanying drawings, the simplicity of the device, as well as the advantages thereof will, it is thought, be perfectly apparent to those skilled in the art to which such inventions appertain without further detailed description.

Having thus described the invention, what we claim is:

In a nut lock, the combination with a bolt, of a nut provided upon its inner and outer faces with recesses, a longitudinal bore connecting the said recesses, a spring lock mounted in the inner recess, a pin extending through said bore and having one end thereof rotatably mounted in said spring lock, the opposite end terminating in a flattened head, said head being semi-circular in shape and having a transverse opening therein, the said nut being provided with a transverse slot formed in the lower end of the outer recess, the said head adapted to work within the slot, all substantially as and for the purpose set forth.

In testimony whereof we affix our signatures in presence of two witnesses.

JOHN E. NORTH.
JAMES H. McCAULEY.
JOHN G. BYTHEWAY.

Witnesses:
PATRICK McNULTY,
FRANK E. REESE.

Copies of this patent may be obtained for five cents each, by addressing the "Commissioner of Patents, Washington, D. C."